United States Patent [19]

Frazier et al.

[11] Patent Number: 5,341,141
[45] Date of Patent: Aug. 23, 1994

[54] THREE DIMENSIONAL IMAGING RADAR

[75] Inventors: Lawrence M. Frazier, West Covina; James B. Sheffler, Chino; Ronald F. Carlson, Highland, all of Calif.

[73] Assignee: Hughes Missile Systems Company, Los Angeles, Calif.

[21] Appl. No.: 28,451

[22] Filed: Mar. 9, 1993

[51] Int. Cl.$^5$ .............................................. G01S 13/89
[52] U.S. Cl. ..................................... 342/59; 342/129; 342/179; 342/180
[58] Field of Search ................. 342/59, 128, 129, 180, 342/179

Primary Examiner—Gilberto Barrón, Jr.
Attorney, Agent, or Firm—Charles D. Brown; Randall M. Heald; Wanda K. Denson-Low

[57] ABSTRACT

A three dimensional imaging radar system and method for generating and processing radar information to produce a three dimensional image of objects viewed by the system. The system is designed to create three dimensional images of physical objects at relatively short range, up to a distance of about 1000 feet. The radar system comprises a servo controlled antenna system, wherein the servo system provides azimuth and elevation pointing angle output signals. Two radar transmitters provide radar signals in two different radar bands that are selectively transmitted by the antenna system as a radar beam. A radar receiver preprocesses radar return signals reflected from targets. A digital signal processor is provided that processes the radar return signals from targets and which embodies system improvements comprising a Fourier transform processor, a coherent integrator that provides low pass and high pass filtering to reduce noise, a detector comprising a digital Pythagorean processor that converts the radar return signals into amplitude values for each range bin, a non-coherent integrator, and an adaptive threshold comparator. A buffer memory is is provided that has a predetermined number of range cells that store the amplitude of the radar return signal at each range. A digital scan converter comprising a three dimensional coordinate converter converts the azimuth and elevation pointing angle signals into x, y and z addresses of radar signals that are stored in the buffer memory. A computer selectively controls the transmission of the radar signals each radar system, adaptively controls the movement of the antenna system using the servo system, and processes the x, y and z addresses of radar signals stored in the buffer memory to produce a three dimensional image for display on a monitor. A digital sweep linearizer is provided which produces a highly accurate linear sweep signal that drives a voltage tuned oscillator. The coherent integrator provides "noise reducing" low pass or high pass filtering of the signals prior to detection. The bandpass of the filters in the coherent integrator is controlled by the digital signal processor.

14 Claims, 4 Drawing Sheets

THREE DIMENSIONAL IMAGING RADAR

BACKGROUND

The present invention relates generally to radar systems, and more particularly, to a three dimensional imaging radar system that is adapted to create three dimensional images of physical objects at relatively short range.

Over the past several decades, different types of radar data displays have been developed to help the radar operator interpret the information generated by a radar system. The most common of these displays is a two dimensional (top down) display known as a plan position indicator (PPI) display. The PPI display provides information about the slant range and bearing from the radar to radar targets.

In a common two dimensional air traffic control radar, for example, an antenna beam is normally shaped to create a vertical fan beam so that all airborne targets from near the ground to a maximum altitude of interest are detected as the radar sweeps a 360 degree path around the radar. This type of radar system provides only azimuth and slant range to a target but does not provide any information about the target's height above the ground. Each target is represented as an intensified dot on the radar display. By observing changes in the position of the dot from radar scan to scan, the operator can identify moving targets as well as fixed targets on the display.

Many other forms of radars and radar displays have been developed including an SPS-39/48 three dimensional radar that provides elevation scanning information to determine target altitude. The displays on these radar systems display intensified spots of azimuth versus range or elevation angle versus range to targets.

The present invention is an improvement to a previously developed three dimensional radar system manufactured by the assignee of the present invention. The previously developed system uses a 12 inch diameter, center-fed subreflector, comprising a parabolic fixed dish antenna. In this system the radar transmitter signal is generated by circuits located directly above the fixed antenna. The signals are fed directly to a small "circular horn assembly" that is located in the center of the antenna. A small subreflector mounted in front of the horn and dish, reflects the energy back to the parabolic dish antenna which then radiates the energy with the proper radar beam shape. The signal reflected from the dish antenna is beamed straight down to a flat splash plate reflector that is located directly below the dish antenna. The dish antenna has a problem wherein strong reflections coming from the subreflector prevent reception of some weak signals. The dish antenna also prevents radar operation in two radar bands at the same time.

In the prior system, the movable flat splash plate reflector is located directly below the dish and is oriented at approximately a 45 degree angle with respect thereto. The splash plate reflector is continuously rotated (360 degrees) up to two times a second. The splash plate reflector may be stepped in 0.5 degree increments every revolution. This allows the antenna beam to be positioned or scanned a full 360 degrees in azimuth and ±15 degrees in elevation. The splash plate reflector has the disadvantage of covering too much area and requiring a long time to perform an elevation scan. The elevation beam can only be moved once each rotation of the antenna. It has a further limitation that even if a small area is to be viewed, the scan rate is limited by the 360 degree rotation rate. The advantage is simplicity and lower cost.

In the prior system, the primary radar operates at 56 GHz. A separate 10 GHz transmitter, receiver, and antenna (ATR) assembly was built to operate at 10 GHz. That radar performed as expected, but it was desired that the system have the capability to switch between frequencies without physically removing and replacing the ATR assembly.

The prior radar is based upon linear swept frequency continuous wave (SFCW) technology, which is well known in the art. In any SFCW radar the key parameter for performance is sweep frequency linearity. The better the linearity, the better the target resolution and noise. The prior system uses an analog sweep linearity control. While the system performs quite well under normal operation, it requires almost ½ hour to warm up and stabilize. It is also quite difficult to set up and maintain. The system relies on delay line compensation which requires about 30 feet of very low loss coaxial cable to be wound around the back of the reflector dish.

The prior system uses a digital fast Fourier transform (FFT) circuit to convert the received signals to range cells containing the amplitude of the return signal in each range cell. The amplitude values (8 bits) from each range cell are sent to a two dimensional digital scan converter (DSC). The DSC converts antenna pointing information into two dimensional addresses (X and Y) for storage in a buffer memory where the amplitude values for each "area cell" are stored for later processing.

There is no additional signal processing or filtering in the prior system. A computer performs the conversion from two dimensional to three dimensional plotting and target threshold and filtering processes. While the system performs reasonably well, there is a limit in just how much the computer can do in real time.

The prior system uses a two dimensional buffer memory that stores target amplitude information. The hardware buffer is 320 (X) by 200 (Y) cells, requiring 64K bytes (8 bit amplitude) storage. The position encoders located on the antenna translate the antenna pointing position (azimuth only) to SIN and COS values that are multiplied by the range cell number to determine which of the 64K memory cells to place the amplitude information.

The output of this buffer is transferred to a digital signal processor (DSP) once each rotation of the splash plate reflector. The buffer is "flushed" and the information from the next rotation of the antenna is stored. As the antenna elevation position is changed, an elevation correction factor is used to correct for that change. This is a very computational intensive process for the computer.

The prior system requires direct connection of a keyboard and a VGA color display. No remote capabilities are provided.

Accordingly, it would be an advance in the radar art to have a three dimensional radar that may be switched between two operating frequencies, that improves reception of weak signals, and that has improved signal processing capabilities and processing efficiency.

SUMMARY OF THE INVENTION

The present invention is a unique three dimensional imaging radar system and method for generating and processing radar information to produce a three dimensional image of objects viewed by the radar system. The present three dimensional radar system is designed to create three dimensional images of physical objects at relatively short range, up to a distance of about 1000 feet.

The three dimensional imaging radar system comprises an antenna system having a servo control system coupled thereto for adaptively controlling movement thereof in response to applied control signals. The servo system provides azimuth and elevation pointing angle signals derived from the antenna system as output signals. First and second radar transmitters are coupled to the antenna system that provide radar signals in two predetermined radar bands that are transmitted by the antenna system to form a radar beam. A radar receiver is coupled to the antenna system that is adapted to receive radar signal energy reflected from a target at a selected one of the first and second radar bands.

A digital signal processor is coupled to the radar receiver for processing radar return signals from targets from which the radar signals are reflected. The digital signal processor comprises an analog to digital converter, a Fourier transform processor coupled to the analog to digital converter, and a coherent integrator filter coupled to the Fourier transform processor for low pass and high pass filtering of the signals to reduce noise. A detector is coupled to the coherent integrator filter that comprises a digital Pythagorean processor that converts the signal to amplitude values for each range bin. A noncoherent integrator is coupled to the detector, and an adaptive threshold comparator coupled to the integrator.

A buffer memory is coupled to the adaptive threshold comparator that comprises a predetermined number of range cells that are adapted to respectively store the amplitude of the radar return signal at each range. A digital scan converter comprising a three dimensional coordinate converter is coupled to the buffer memory and to the servo control system for converting the azimuth and elevation pointing angle signals into x, y and z addresses of radar signals that are stored in the buffer memory.

A computer is coupled to the buffer memory, to the first and second radar transmitters, and to the servo control system, and controls the transmission of the radar signals from the selected one of the radar systems, adaptively controls the movement of the antenna system under control of the servo system, and processes the x, y and z addresses of radar signals stored in the buffer memory to produce a three dimensional image for display. A display is coupled to the computer for displaying the three dimensional radar image generated by the computer.

The antenna system comprises a parabolic main reflector, and a movable and rotatable flat reflector. The servo control system comprises two separate and independent servo control systems, wherein one system provides for elevation control of the movable and rotatable flat reflector and the other system provides for azimuth control of the movable and rotatable flat reflector. The three dimensional imaging radar system may include a log compression circuit coupled between the noncoherent integrator and the threshold comparator for improving the dynamic amplitude range of the processed signals.

The adaptive threshold circuit is adapted to automatically average the radar signal and noise in a predetermined number of range cells to establish a dynamic threshold level based upon the signal and noise levels, and wherein the amplitude information is compressed into a two bit word with amplitude values of 0 through 3 for all targets that are detected.

The radar system may also include a peak amplitude filter for filtering of the noise average to prevent small, high amplitude signals from affecting the noise average. The adaptive threshold circuit comprises a target edge and peak detector for outlining targets and providing information about their shape and characteristics.

The radar system may also comprise a remote control and display unit that allows operation of the radar at a predetermined distance from the radar system. The remote control comprises a telephone keypad. The remote control unit and radar are coupled together by means of a coaxial television cable, and wherein keypad signals and power and television signals are passed over the coaxial cable.

The digital sweep linearizer comprises a fixed frequency oscillator, a mixer coupled to an output of the oscillator, a frequency divider coupled to an output of the mixer, an amplifier coupled to an output of the frequency divider. A digital frequency controller is provided that is adapted to receive an input signal from the sawtooth signal generator. A phase lock oscillator is coupled to the digital frequency controller. A phase error detector/amplifier is coupled to the amplifier and to the phase lock oscillator that is adapted to process signals received therefrom and coupled to the sawtooth signal generator for providing a converted sawtooth sweep signal thereto.

The sawtooth signal generator comprises a sync generator that provides a start of sweep sync pulse, a digital counter/scaler coupled to the sync generator for receiving the start of sweep sync pulse and coupled to the digital frequency controller of the digital sweep linearizer, a digital to analog converter coupled to the digital counter/scaler, and a summing network coupled to the digital to analog converter and to the phase error detector/amplifier of the digital sweep linearizer.

The radar beam provided by the radar system is a small diameter pencil beam that has an extent of about 0.5 degrees (two way) in both azimuth and elevation. Reflected radar target information is stored in the three dimensional image buffer. The data stored in the image buffer is processed by a computer to create life-like images of targets in the volume that is scanned. The images created by the present system and method are similar to holograms. An operator view of the images may be rotated (using the computer) over the full spherical coordinate system to view the target and it's surroundings from any perspective position in space.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
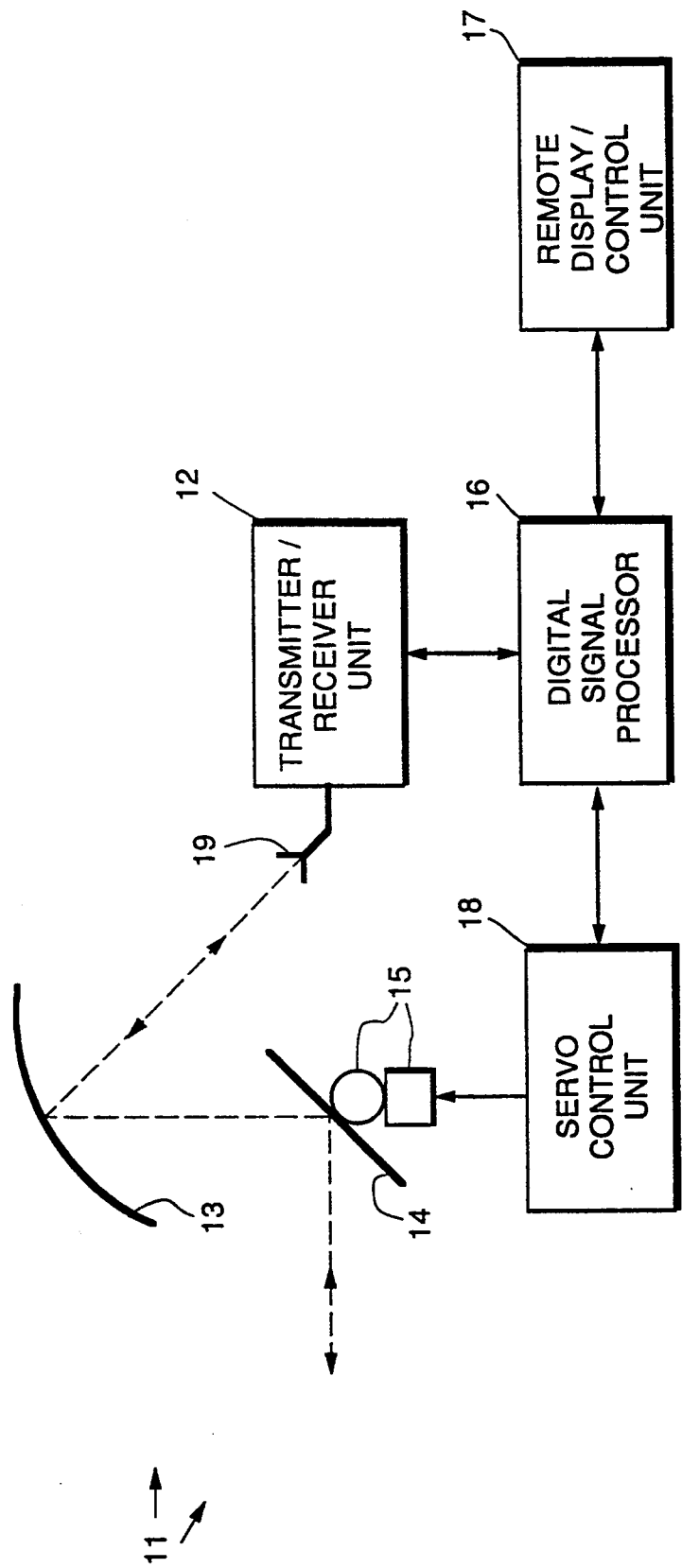
FIG. 1 shows a block diagram of a three dimensional radar system in accordance with the principles of the present invention.

Referring to the drawing figures, FIG. 1 shows a system block diagram of a three dimensional radar system 10 in accordance with the principles of the present invention. The three dimensional radar system 10 is comprised of an antenna unit 11 that is coupled to a transmitter-receiver unit 12. The antenna unit 11 is comprised of a parabolic dish main reflector 13 and a movable and rotatable flat plate reflector 14, or splash plate reflector 14, that is controlled by a plurality of servo motors 15. The transmitter-receiver unit 12 is coupled to a digital signal processor (DSP) 16 that is adapted to process transmitted and received radar signals and display the received signals on a display that is part of a remote display/control unit 17. The transmitter-receiver unit 12 is adapted to transmit and receive radar signals by means of feed horns 19 that couple the radar signals between the main reflector 13 and the transmitter-receiver unit 12. The digital signal processor 16 is also coupled to a servo control unit 18 that is in turn coupled to the servo control motors 15 in the antenna unit 11. The servo control motors 15 are coupled to the movable and rotatable splash plate reflector 14 that is used to scan (steer) the radar beam provided by the system 10.

Figure 2:
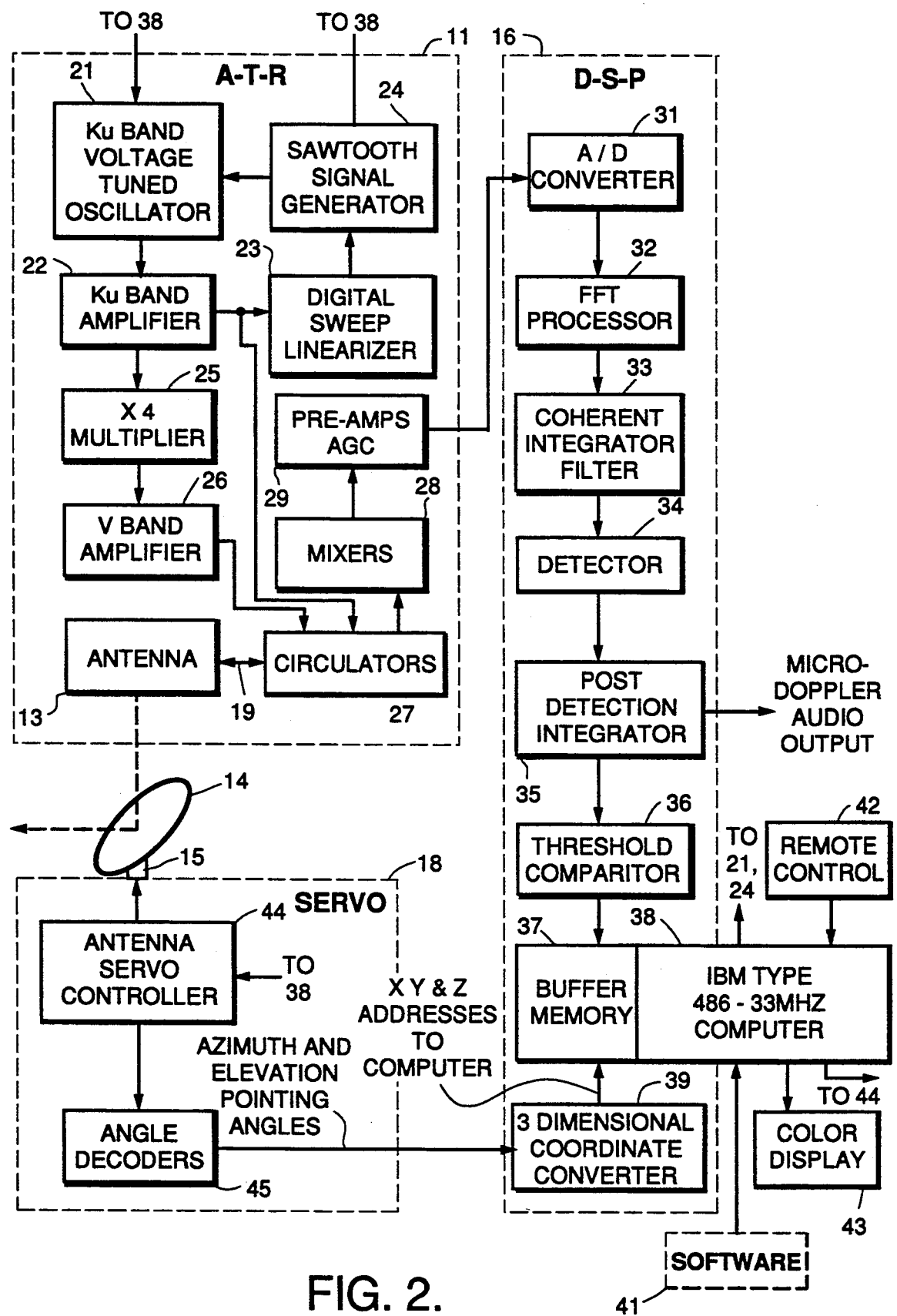
FIG. 2 shows a detailed block diagram of the three dimensional radar system of FIG. 1.

A detailed block diagram of the radar system 10 used to demonstrate the concepts and radar design characteristics of the present invention is shown in FIG. 2. The radar system 10 is comprised of the antenna-transmitter-receiver unit (ATR) 11 which includes a Ku band voltage tuned oscillator 21 whose output is coupled through a Ku band amplifier 22, a times 4 multiplier 25 and a V band amplifier 26 to circulators 27 that couple the energy by way of the feed horns 19 to the main antenna 13. The circulators 25 are also coupled to a plurality of mixers 28. An output of the Ku band amplifier 22 is also coupled to the circulators 27 and to a digital sweep linearizer 23 in accordance with the principles of the present invention. The digital sweep linearizer 23 is coupled to a sawtooth signal generator 24 which is coupled to the voltage tuned oscillator 21. Outputs of the circulators 27 are coupled by way of the plurality of mixers 28 to preamplifier and automatic gain control circuits 29 which in turn generate output signals from the antenna transmitter receiver unit 11 that are applied as input signals for processing by the digital signal processor 16.

The output of the antenna transmitter receiver unit 11 is a radar signal that is applied to the splash plate reflector 14. The servo controller 18 is comprised of an antenna servo controller 44 which is coupled to the splash plate reflector 14 and to angle decoders 45 that are disposed on the splash plate reflector 14 (although this is not depicted in FIG. 2). Outputs of the angle decoders 45 are applied to the digital signal processor 16.

The digital signal processor 16 is comprised of an analog to digital converter 31 that receives the input signal derived from the preamplifier and automatic gain control circuits 29 of the antenna transmitter receiver unit 11. Outputs of the analog to digital converter 31 are coupled to a fast Fourier transform (FFT) processor 32 that provides an output signal that is filtered by a coherent integrator filter 33 and applied to a detector 34. A post detector integrator 35 generates a micro-doppler audio output signal and provides a signal that is applied to a threshold comparator 36. An output of the threshold comparator 36 is coupled to a buffer memory 37 that may comprise a portion of a memory in a computer 38, such as an IBM 486 personal computer, for example. A three dimensional coordinate converter 39 is coupled to the angle decoders 45 and to the buffer memory 38 and is adapted to receive azimuth and elevation pointing angle signals therefrom and processes them to generate three dimensional coordinate signals that are stored in the buffer memory 37. The computer 38 is coupled to a color display 43 that is adapted to display the radar image generated by the system 10 and to remote control circuitry 42 which is adapted to remotely control the radar system 10. The remote control circuitry 42 is comprised of a keypad and is packaged with the display 43. Software 41 is provided that runs on the computer 38 to process the radar signals and the three dimensional coordinate signals stored in the buffer memory 38 to generate the radar image.

The radar system 10 generates a three dimensional image using the movable and rotatable splash plate reflector 14 and operates at a primary frequency of about 56 GHz. A secondary low band radar operating at 14 GHz is also provided and is used to provide extended range. Referring to the system block diagram of FIG. 2, the radar system 10 utilizes linear swept frequency continuous wave (SFCW) modulation with a sweep bandwidth of about 3 GHz. This bandwidth produces two inch target range resolution. Narrower frequency sweeps may be selected for longer range displays with less range resolution. It is to be understood that any radar waveform that provides this bandwidth and resolution may be used to develop information that is processed by the digital signal processor 16.

The main reflector 13 is a one foot diameter parabolic dish antenna that produces a 0.6 degree (two way) half power beamwidth. This beamwidth provides approximately two inch angle resolution at a 16 foot range. The energy produced by the transmitter of the transmitter-receiver unit 12 is applied to the main reflector 13 from a respective off-center feed horn 19 located approximately two inches from the edge of the antenna transmitter/receiver unit 11.

The parabolic dish main reflector 13 concentrates the energy into a narrow beam that is projected downward onto the movable flat plate reflector 14. The flat plate reflector 14 is tilted at a mean angle of about 45 degrees with respect to the vertical to change the radiation direction. The flat plate reflector 14 may be electrically moved in both azimuth or elevation by way of the electronically controlled servo motors 15 coupled thereto, under control of the antenna servo controller 44. Thus, the radar beam may be scanned (steered) in both azimuth or elevation at relatively high speeds. The controlled servo motors 15 incorporate precision angle encoders 45 on both axes to provide high resolution angle pointing information.

The azimuth and elevation pointing angles and range information are converted from polar volume coordinates to Cartesian (X, Y, Z) coordinates in the digital signal processor 16. This conversion creates constant size blocks or voxels that are the size of the radar resolution volume. The complete set of these voxels represents a total volume scanned by the radar system 10.

A "radar range value" is first multiplied by the antenna beam elevation pointing angle [RANGE*COS-(ELEVATION)] to determine the true horizontal range to a target. The [RANGE*SIN(ELEVATION)] provides the "Z" or height values of the volume. The true horizontal range is then multiplied by the SIN or COS of the azimuth angle to produce an "X" (cross range) and "Y" (down range) addresses for each data bit received from the radar. The boundary of the X, Y and Z addresses represents a location in a volume buffer memory 37 in the digital signal processor 16 that is directly related to the volume scanned by the radar system 10.

The digital signal processor 16 provides adaptive, automatic target detection. The digital signal processor 16 saves the position and amplitude information from detected targets to reduce the data load on the computer 38. The position information about each detected target point is stored in the three dimensional data (volume) buffer memory 37 in the computer 38.

The three dimensional volume buffer 37 is scanned by the computer 38 as though viewed from any operator observation angle. Scan factors relating to vanishing angle, view point, and lighting angles are used to control the volume scan characteristics. As the three dimensional volume is scanned, a two dimensional image is created that provides a "projection" of the objects in the volume based upon the observation criteria discussed above. Visually hidden targets are properly hidden in the display by initiating the volume scan from the rear of the volume toward the observation point and overwriting the hidden targets.

A two dimensional projection of the three dimensional volume is then displayed on the radar display 43. As each new two dimensional image is generated, the old image is stored in the buffer memory 37. A form of animation may be created by rapidly and sequentially flashing back through past images. If the three dimensional viewpoint is changed each time a new image is generated, the animated image appears to move around allowing an operator to view the image as it would look from any location around the three dimensional volume.

The primary radar operates at 56 GHz with a linear FM bandwidth of 3 GHz. The linear sweep is repeated every 200 microseconds (KHz rate). The radar receiver converts the frequency difference between the transmitted wave and the received wave to a time-amplitude wave which is constant during each linear sweep for fixed targets.

This linear sweep signal is produced by using closed loop comparison of the analog generated sweep signal at 14 GHz that is divided down to approximately 1 GHz with a precision digitally generated stepped sweep at 1 GHz. This closed loop comparison is provided by means of a digital sweep linearizer, a sawtooth signal generator, a voltage tuned oscillator and an amplifier, which will be described with reference to FIG. 3 below. The step error between the digitally generated sweep and the analog sweep is feed back to the analog sweep to produce a highly accurate linear sweep at 14 GHz. The amount of frequency swing and the radar center frequency can be adjusted by proper adjustments of a digital reference signal. The 14 GHz signal is multiplied to 56 GHz where it is amplified and then applied to its respective antenna feed horn 19.

The time-amplitude wave is digitally sampled and converted to the frequency-amplitude domain through the use of the fast Fourier transform (FFT) processor 32. Each of the 512 frequency bins at the output of the FFT represent a "range cell" that also corresponds to two inches of range (512 two inch cells, or about 80 feet at maximum resolution). Thus, the precise range to any target may be determined by the range cell number representing that target range.

Conventional target detection processes are used to identify those range cells that have targets with reflectivity greater than the threshold level set in the receiver detector 34. Those range cells that contain targets are then multiplied by the azimuth and elevation angles in the coordinate converter to determine the X, Y and Z coordinates of each point in space. That information is the address in the volume of the three dimensional volume space described above.

An IBM 486 computer operating at 33 MHz with 8 megabytes of memory is used in the system 10 as the computer 38. The three dimensional volume is arranged with X values from 1 to 320, Y values from 1 to 200 and Z values from 1 to 64. This volume requires over 4 megabytes of memory for complete storage. The time required to scan through the volume is on the order of several hundred milliseconds using the computer 38.

To greatly increase the conversion process, an inverse image scanning technique is employed. The radar output data is stored in the sequence that it is received rather than in the volume space described above. Each data point has a valid three dimensional address associated with it. The computer 38 reads the address of each valid target. Based upon the three dimensional coordinates of the target, and upon the viewing criterion selected by the operator, the computer 38 determines the location of the respective point in the two dimensional rendition of the volume. The proper intensity and color are also added to enhance the quality of the image on the display 43.

A separate three dimensional buffer 37 is used to store all target data over an image frame period so that a redundancy filter that is part of the buffer memory 39 can eliminate those target returns that have already been sent to the display 43 for viewing. The redundancy filter also helps speed the display process by eliminating redundant data from the display processor in the computer 38. The redundancy filter checks to see if a particular (x,y,z) data has been previously sent to the computer 38. If the data has previously been sent, then the data is not sent to the computer. This same technique is used to eliminate all non-moving targets from the image by allowing target returns that have not previously been stored in the buffer 37 to be displayed on the display 43. Thus if the scene does not change from scan to scan, the display 43 is not further updated and the computer 38 processes less data.

The present three dimensional radar system 10 thus provides a means for generating target position information in three dimensional spherical coordinates. The radar system 10 converts the information from three dimensional spherical coordinates to three dimensional Cartesian coordinates. The radar system 10 converts information in three dimensional Cartesian coordinates to a two dimensional replica of the three dimension information. The radar system 10 rotates the information forming the two dimensional image to allow observation of the targets in the three dimensional volume from any view point, in or around, the three dimensional volume. The radar system 10 generates a target range resolution of at least two inches using linear FM radar techniques. The radar system 10 generates a linear FM signal with 3 GHz bandwidth.

The present radar system 10 incorporates a number of improvements that were made to the prior radar system discussed in the Background section. The antenna feed arrangement of the present radar system 10 uses the off-center fed, partial parabolic dish antenna 13. In the present system 10, the transmitter is located below and to the rear of the partial parabolic dish antenna. Two antenna feed horns 19 (56 GHz and 14 GHz) are placed side by side for dual band operation. The signal reflected from the dish antenna 13 is beamed straight down to the flat splash plate reflector 14 that is directly below the main antenna 13. This system 10 has the advantage of eliminating back reflections from the dish antenna 13, and also provides for dual band operation. It has higher overall efficiency and there is much better control over the antenna beam shape.

The present radar system 10 uses two separate and independent servo control systems in the servo control unit 18. One system provides elevation control and the other provides azimuth control. The control resolution is ±0.1 degrees. The azimuth may be scanned or positioned anywhere ±110 degrees of straight ahead. The elevation may be positioned ±12 degrees. The computer 38 can position the splash plate antenna 14 to steer the beam to any location or scan about that location. This provides very fast, precision beam steering for the present system 10.

In the present radar system 10, two radars (56 GHz and 14 GHz) are combined into an integrated package. Both radars are fully controlled by the computer 38 and may be switched back and forth in less than a second. Separate antenna feed horns 19 are used for each frequency eliminating costly common feeds. The only drawback is that the antenna beam is slightly skewed from one band to the other, but the computer 38 easily compensates for this.

The present system 10 uses a combination of digital and analog linearity controls. The analog portion uses the 14 GHz master oscillator 21 that is frequency modulated by a sawtooth signal provided by the sawtooth signal generator 24 to produce a somewhat linear frequency sweep. The output of this oscillator 21 is converted to a base band (3 to 15 MHz) where a precision, digitally generated linear sweep is also generated. The two signals are compared and the error used to modify and "linearize" the 14 GHz sweep. The total frequency sweep of the 14 GHz oscillator 21 can be controlled from approximately 1 GHz down to a few hundred KHz. The output of the 14 GHz oscillator 21 is applied directly to the ½ watt power amplifier 22 and then to the antenna feed 19. A second output from the 14 GHz oscillator 21 is fed to the times four ($\times 4$) multiplier 25 that multiplies the signal up to 56 GHz. The output of the times four ($\times 4$) multiplier 25 is approximately 100 milliwatts and is applied directly to the "high band" antenna feed 19. The design of the present radar system 10 is very stable, requires no warm up time, and is much more linear than the analog system provided by the prior system.

As in the prior system, the present radar system 10 also uses the FFT processor 32 to generate "range cells". However a new hardware coherent integrator/difference circuit 33 performs valuable coherent signal processing prior to the detector 34. The coherent integrator/difference circuit 33 provides "noise reducing" low pass or high pass filtering of the signals prior to detection. The bandpass of the filters in the coherent integrator/difference circuit 33 is controlled by the digital signal processor (DSP) 16.

The output of the coherent integrator 33 is applied to the detector 34 (comprising a digital Pythagorean processor) that converts the signal to amplitude values for each range bin. The output is applied to the buffer memory comprising 256 range cells, each containing the amplitude of the radar return at that range.

The post detection integrator/difference circuit comprising the noncoherent integrator 35, is used to further filter the detected signal. The noncoherent integrator 35 is fully controlled by the digital signal processor 16. The output amplitude of the noncoherent integrator 35 is passed through a log compression circuit that is part of the adaptive threshold circuit 36 that further improves the dynamic amplitude range of the processed signals.

The adaptive threshold circuit 36 automatically averages the signal and noise in up to 32 range cells to establish a dynamic threshold level based upon the local signal and noise levels. Averaging from 2 range cells to 32 range cells can be selected from the digital signal processor 16. Three different threshold levels may be set by the digital signal processor 16, each of which are relative levels above the adaptive noise floor. Thus, the amplitude information is compressed into a two bit word with amplitude values of 0 through 3 for all targets that are detected.

Provisions are also provided for peak amplitude filtering of the noise average to prevent small, high amplitude signals from affecting the noise average. Fixed amplitude thresholding may be selected by the operator using the digital signal processor 16. A target edge and peak detector is also provided as an integral part of the adaptive threshold circuit 36 to help outline targets and provide additional information about their shape and characteristics. A plurality of amplitude thresholds are programmed into the threshold circuit 36 (a PAL device) that permit the determination of edges and peaks in the data. In particular, the threshold circuit 36 compares the amplitudes of adjacent range cells to determine slopes and peaks of the signal to identify the edges and peaks.

In the present system 10, the digital scan converter uses hardware to compute the precise three dimensional pointing angles of the antenna. The output of the adaptive threshold circuit 36 contain one of four amplitude values. Zero is defined as those range cells with signal levels below threshold one. A value of one through three is a relative amplitude of the range cells that exceed the respective thresholds. Thus, data samples with an amplitude value of zero are discarded. Only those amplitude values of one or greater are passed to the digital scan conversion circuit. This greatly reduces the number of values that are transferred to the digital signal processor 16.

The "range number" of each range cell that exceed the threshold is multiplied by the respective SIN and COS values to determine that image pixel location in 3 dimensional space. Thus, a three dimensional pseudo image volume of 320 (X) by 200 (Y) by 64 (Z) is established into which only the targets that pass the threshold criterion are placed. One 32 bit word is used to describe each target location in this volume. The buffer memory 37 in the digital signal processor 16 is a 4K byte hardware buffer that allows near real time transfer of the data from the digital signal processor 16 to the computer 38.

The computer 38 takes the information from the radar digital signal processor 16 and produces three different views of the radar surveillance volume, including a top down view, a side view, and a three dimensional view. These three views require additional computer processing provided by the computer 38 to "smooth, position, measure, and color" the data to help the operators identify salient features of the targets. The three dimensional view is a "snap shot" of a selected area that may then be "rotated" by the digital signal processor 16 as though the operator was looking at the selected target from any angle around the target. This three dimensional view is the most impressive of the displays shown on the radar display 43.

The present system 10 has a compact remote control and display unit 17 that is capable of operating at least 400 feet from the radar system 10. This allows the operator to remain safely away from the radar system 10. The display 43 uses standard television transmission on TV channel 3 or 4, similar to a commercial VCR interface. The control of the radar system 10 is done via a standard telephone keypad in the remote control 42 that is mounted on the remote control/display unit 17. The display 43 is a Sony "Watchman" flat plate display with an 8 mm video tape recorder (VCR). This allows the radar output to be recorded directly for later review. Any commercial TV set may also be used as a monitor.

The interface between the radar and the remote control unit 17 is achieved using a single RG/59 coaxial TV lead-in cable. Both the remote keypad signals and power as well as the TV signals are passed over this single coax cable. This makes the system 10 very flexible in the field. The "telephone keypad" was chosen because it is easily adapted to remotely control the radar system 10 using a cellular telephone at any distance. The commercial TV was chosen also because commercial equipment may be used to transmit the picture anywhere.

The present radar system 10 is adapted to remotely operate and display the image from the second radar system using a single coax cable. This interface is achieved using a commercial Ethernet high speed data transmission link that is inherent in both radars. The software 41 in the computer 38 directs the controls between the two radars and also correlates and colors the data from both so that the operator can rapidly identify where the information is coming from.

In the present system 10, this dual radar interface was adapted so that a remote "lap top" or other standard desk top computer with the same interface may be used to operate the radar and display its images. This provides a much higher quality display of the data and added flexibility for computer control and software.

Figure 3:
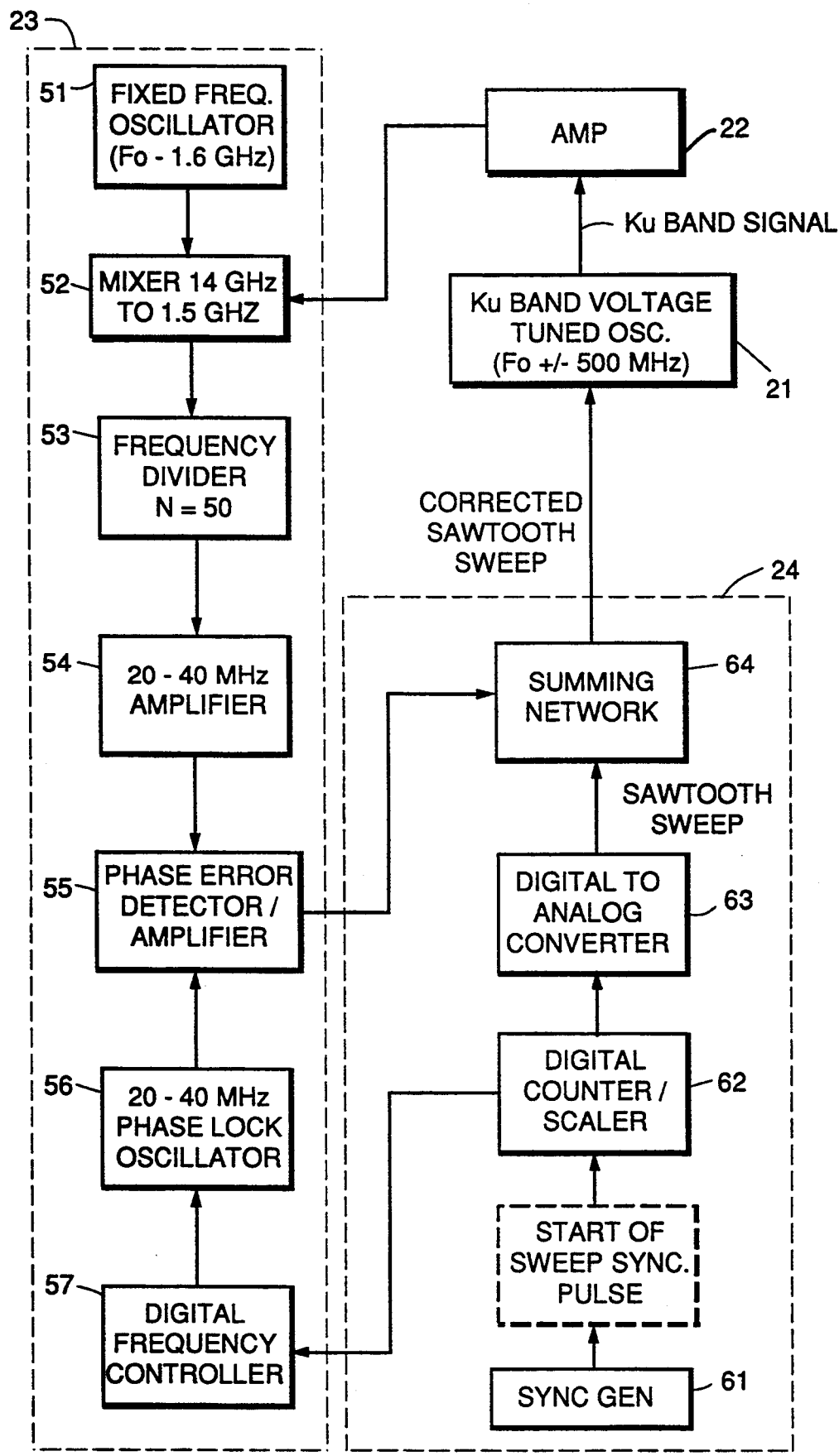
FIG. 3 shows a detailed block diagram of a portion of the three dimensional radar system of FIG. 2 focusing on its digital sweep linearizer and related circuitry.

FIG. 3 shows a block diagram of a portion of the antenna transmitter receiver unit 11, focusing on the digital sweep linearizer 23 and related circuitry of the dimensional radar system 10 shown in FIG. 2. A key problem to be solved by the digital sweep linearizer 23 is the creation of an extremely linear rate of change of frequency for the transmitter of the linear swept frequency continuous wave radar system 10. Any nonlinearity causes contamination of the received radar signals. The received signal is related to the transmitted signal by the relationship:

Received frequency=(Rate of change of transmitter frequency)*(Range time).

In any radar, the energy returned to the radar from a reflecting target has been delayed in time due to the range to the targets. In a linear swept frequency continuous wave radar the transmitter frequency is continuously changing frequency. The received frequency is at the frequency that was transmitted, not the new frequency that the transmitter has swept to during the time it took the signal to go from the radar to the target and back. The linear swept frequency continuous wave radars produce a frequency that is proportional to the range of the targets.

If the rate of change of frequency is not precise or very linear, the frequency received for a given target will be smeared or spread in frequency, which is an undesirable condition. Thus it is important to generate as linear a frequency sweep as possible. Due to practical limits and nonlinearity of solid state devices, it is necessary to provide some form of closed loop linearity correction to optimize the sweep. The digital sweep linearizer 23 is a unique approach to the solution of this problem.

Referring to FIG. 3, the digital sweep linearizer 23 is comprised of a fixed frequency oscillator 51 that is coupled to one input of a mixer 52. The output of the mixer 52 is coupled through a frequency divider 53 to an amplifier 54. The output of the amplifier 54 is coupled to one input of a phase error detector/amplifier 55. The output of the phase error detector/amplifier 55 is coupled to the sawtooth signal generator 24. The digital sweep linearizer 23 is also comprised of a digital frequency controller 57 that receives an input from the sawtooth signal generator 24. The digital frequency controller 57 is coupled to a phase lock oscillator 56 which is in turn coupled to a second input of the phase error detector/amplifier 55.

The sawtooth signal generator 24 is comprised of a sync generator 61 that provides a start of sweep sync pulse that is applied to an input of a digital counter/scaler 62. One output of the digital counter/scaler 62 is coupled to the digital frequency controller 57 of the linearizer 23 and a second output is coupled to a digital to analog converter 63. The output of the digital to analog converter 63 is coupled to one input of a summing network 64 while the phase error detector/amplifier 55 in the linearizer 23 is coupled to a second input of the summing network 64. The digital to analog converter 63 provides a sawtooth sweep signal to the summing network 64 while the phase error detector/amplifier 55 which provides a corrected sawtooth sweep signal as its output.

The corrected sawtooth sweep signal is coupled to the Ku band voltage tuned oscillator 21 which provides a Ku band signal to the power amplifier 22. The power amplifier 22 provides an output signal that is coupled to the mixer 52 in the digital sweep linearizer 23.

In operation, the digital sweep linearizer 23 converts a small sample of the transmitted signal down to an intermediate frequency (IF), in this case approximately 1.5 GHz±500 MHz, using the mixer 52. The downconverted signal is amplified and then applied to the frequency divider 53 where the instantaneous frequencies are divided by a factor of 50. Although 50 was chosen as a convenient division factor, it is to be understood that any division factor may be used to properly scale the converted frequencies. The converted linear swept frequency continuous wave signal covers the frequency range of 20 to 40 MHz, but contains all of the frequency domain characteristics of the original signal.

A second, very precise digitally generated linear swept frequency continuous wave signal is generated at the same 20 to 40 MHz region in the phase error detector/amplifier 55. A commercially available digital phase lock oscillator 56 (such as those used in radio scanners) is controlled by the digital frequency controller 57. The frequency is linearly stepped in frequency by the digital counter (not shown). Typically 1024 digital steps are used to step from 20 to 40 MHz. This produces about 20 KHz per step.

The same digital counter/scaler 62 is used in the sawtooth signal generator 24 to generate a linear sawtooth sweep voltage by applying the same digital counter values to the digital to analog converter 63. This sawtooth sweep is used to directly frequency modulate the Ku band voltage tuned oscillator 21. The downconvened sample of the transmitted signal is compared to the linear swept frequency continuous wave signal generated by a second digital frequency generator comprising the phase lock oscillator 56, and any differences are detected in the phase error detector 55. This error is amplified and applied to the summing network 64 which places corrections on the voltage controlling the Ku band voltage tuned oscillator 21. By properly adjusting the gains and bandpass of the amplifier linearities in the order of 0.001 percent may be achieved. Second order phase noise is also reduced because the response of the phase error detector/amplifier 55 is sufficient to cancel this type of noise. While feedback loops have been used for many years to control the output frequency of a specific oscillator, the use of this configuration is believed not to have been used previously hereto.

Figure 4:
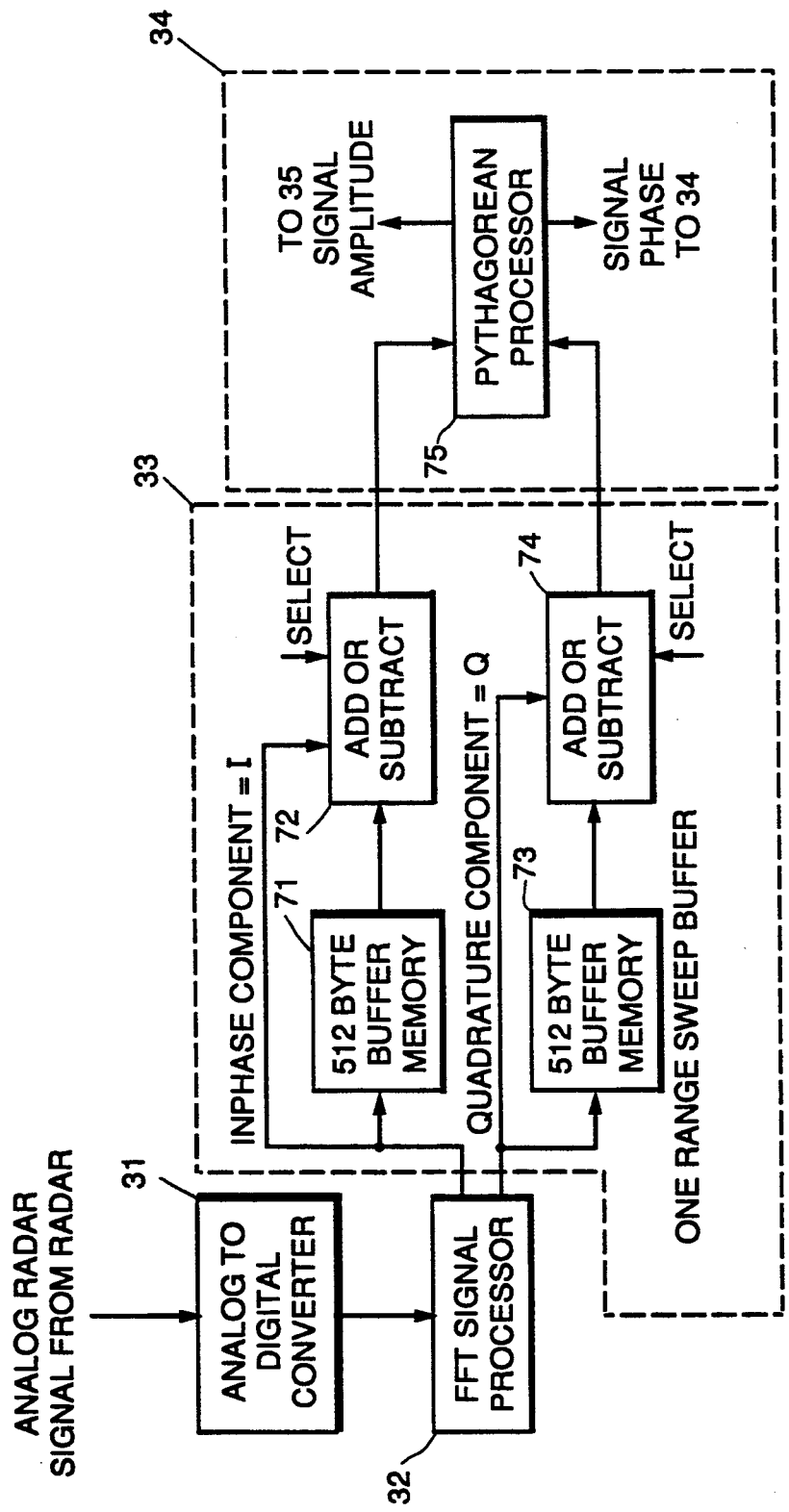
FIG. 4 shows a detailed block diagram of the coherent integrator employed in the three dimensional radar system of FIG. 2.

Referring to FIG. 4, it shows details of the coherent integrator 33 employed in the three dimensional radar system 10 of FIG. 2. The coherent integrator 33 is comprised of two 512 byte buffer memories 71, 73 that are each coupled to the FFT signal processor 32 and which respectively receive and store in-phase and quadrature signals (I, Q). The buffer memories 71, 73 are respectively coupled to addition and subtraction logic 72, 74, respectively, which each selectively add or subtract the in-phase and quadrature signals (I, Q) with the stored versions of the in-phase and quadrature signals (I, Q). Selection of the add or subtract function is controlled by select signals provided by the computer 38. Output signals from the addition and subtraction logic 72, 74 are each coupled to a Pythagorean processor 75 (detector 34) which processes the received signals and provides amplitude and phase signals that are coupled to the post detection integrator 35.

In a motion elimination mode that may be selected by the user and controlled by the computer 38, the values in a given range gate are added to the values in the same range bin in the next range sweep using the buffer memories 71, 73 and addition and subtraction logic 72, 74. If motion exists, the sum is reduced because of the variation caused by the motion, and thus there is a reduced output for that range bin produced by the Pythagorean processor 75. In a motion enhancement mode that may be selected by the user and controlled by the computer 38 the values in a given range gate are subtracted from the values in the same range bin in the next range sweep using the buffer memories 71, 73 and addition and subtraction logic 72, 74. If no motion exists, the difference is zero, and thus no output is provided for that range bin. If motion exists, there is an output for that range bin produced by the Pythagorean processor 75.

Thus there has been described a new and improved three dimensional imaging radar system that creates three dimensional images of physical objects at relatively short range. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A three dimensional imaging radar system comprising:

an antenna system;

a servo control system coupled to the antenna system for adaptively controlling movement thereof in response to control signals applied thereto, and for providing azimuth and elevation pointing angle signals derived from the antenna system as output signals therefrom;

first and second radar transmitters coupled to the antenna system for providing radar signals in two predetermined radar bands that are transmitted by the antenna system to form a radar beam;

a radar receiver coupled to the antenna system that is adapted to receive radar signal energy reflected from a target at a selected one of the first and second radar bands;

a digital signal processor coupled to the radar receiver for processing radar return signals from targets from which the radar signals are reflected, wherein the digital signal processor comprises:

an analog to digital converter;

a Fourier transform processor coupled to the analog to digital converter;

a coherent integrator filter coupled to the Fourier transform processor for providing low pass and high pass filtering of the signals to reduce noise;

a detector coupled to the coherent integrator filter that comprises a digital Pythagorean processor that converts the signal to amplitude values for each range bin;

a noncoherent integrator coupled to the detector;

an adaptive threshold comparator coupled to the integrator;

a buffer memory coupled to the adaptive threshold comparator that comprises a predetermined number of range cells that are adapted to respectively store the amplitude of the radar return signal at each range; and a digital scan converter comprising a three dimensional coordinate converter coupled to the buffer memory and to the servo control system for converting the azimuth and elevation pointing angle signals provided thereby into x, y and z addresses of radar signals stored in the buffer memory;

a computer coupled to the buffer memory of the digital signal processor, to the first and second radar transmitters, and to the servo control system, for causing the transmission of the radar signals from the selected one of the radar systems, for adaptively controlling the movement of the antenna system by way of the servo system, and for processing the x, y and z addresses of radar signals stored in the buffer memory to produce a three dimensional image for display; and a display coupled to the computer for displaying the three dimensional radar image generated by the computer.

2. The three dimensional imaging radar system of claim 1 wherein the antenna feed arrangement of the present radar system uses the off-center fed, partial parabolic dish antenna.

3. The three dimensional imaging radar system of claim 2 wherein the antenna feed arrangement comprises:
 a parabolic main reflector; and
 a movable and rotatable flat reflector.

4. The three dimensional imaging radar system of claim 1 wherein the servo control system comprises:
 two separate and independent servo control systems, wherein one system provides for elevation control of the movable and rotatable flat reflector and the other system provides for azimuth control of the movable and rotatable flat reflector.

5. The three dimensional imaging radar system of claim 1 wherein the adaptive threshold circuit further comprises a log compression circuit for improving the dynamic amplitude range of the processed signals.

6. The three dimensional imaging radar system of claim 1 wherein the adaptive threshold circuit comprises means for automatically averaging the radar signal and noise in a predetermined number of range cells to establish a dynamic threshold level based upon the signal and noise levels, and for compressing the amplitude information into a two bit word with amplitude values of 0 through 3 for all targets that are detected.

7. The three dimensional imaging radar system of claim 1 wherein the adaptive threshold circuit further comprises a peak amplitude filter for filtering of the noise average to prevent small, high amplitude signals from affecting the noise average.

8. The three dimensional imaging radar system of claim 1 wherein the adaptive threshold circuit further comprises a target edge and peak detector for outlining targets and providing information about their shape and characteristics.

9. The three dimensional imaging radar system of claim 1 further comprising a remote control and display unit that allows operation of the radar at a predetermined distance from the radar system.

10. The three dimensional imaging radar system of claim 9 wherein the remote control comprises a telephone keypad.

11. The three dimensional imaging radar system of claim 9 wherein the remote control unit and radar are coupled together by means of a coaxial television cable, and wherein keypad signals and power and television signals are passed over the coaxial cable.

12. The three dimensional imaging radar system of claim 1 which further comprises:
 a sawtooth signal generator; and
 a digital sweep linearizer comprising:
 a fixed frequency oscillator;
 a mixer coupled to an output of the oscillator;
 a frequency divider coupled to an output of the mixer;
 an amplifier coupled to an output of the frequency divider;
 a digital frequency controller that is adapted to receive an input signal from the sawtooth signal generator;
 a phase lock oscillator coupled to the digital frequency controller;
 a phase error detector/amplifier coupled to the amplifier and to the phase lock oscillator that is adapted to process signals received therefrom and coupled to the sawtooth signal generator for providing a converted sawtooth sweep signal thereto.

13. The three dimensional imaging radar system of claim 12 wherein the sawtooth signal generator further comprises:
 a sync generator that provides a start of sweep sync pulse;
 a digital counter/scaler coupled to the sync generator for receiving the start of sweep sync pulse and coupled to the digital frequency controller of the digital sweep linearizer;
 a digital to analog converter coupled to the digital counter/scaler; and
 a summing network coupled to the digital to analog converter and to the phase error detector/amplifier of the digital sweep linearizer.

14. The three dimensional imaging radar system of claim 1 wherein the coherent integrator comprises:
 first and second buffer memories respectively coupled to the Fourier transform processor and which respectively receive and store in-phase and quadrature signals provided thereby;
 addition and subtraction logic respectively coupled to the first and second buffer memories which each selectively add or subtract the in-phase and quadrature signals with stored versions thereof in response to a selection signal provided by the computer; and
 a Pythagorean processor coupled to the addition and subtraction logic and which is adapted to processes output signals provided thereby to produce amplitude and phase output signals that are applied to the detector.

* * * * *